May 7, 1957 L. F. JONES 2,791,310

CHARACTER PRINTING AND ENCODING APPARATUS

Filed June 28, 1952

INVENTOR.

Loren F. Jones

BY Morris Rabkin

ATTORNEY

United States Patent Office 2,791,310

Patented May 7, 1957

2,791,310

CHARACTER PRINTING AND ENCODING APPARATUS

Loren F. Jones, Philadelphia, Pa., assignor to Radio Corporation of America, a corporation of Delaware Application June 28, 1952, Serial No. 296,128

8 Claims. (Cl. 197—1)

This invention relates to methods of and apparatus for printing identifiable characters, and a means of automatically scanning the same.

Presently known systems for automatically identifying printed characters utilize a variety of techniques and methods. One of the earlier analyzing systems developed, controlled the operations of accounting or tabulating machines by means of coded index points in the form of perforations in tabulator record cards or sheets. The perforations were positioned variously on a record field according to the data to be recorded thereon. In most of the systems. it was necessary to represent a character by a plurality of perforations arranged in separate columns, thus limiting the amount of information that could be recorded. Also the employment of a code required a skilled operator to transpose the written data into the variously positioned perforations on the record, and the transposition of the written data required a special punching operation. The index points in the form of perforations were sensed by an analyzing means, which usually consisted of pairs of contacts which were closed through the perforations. The analyzing means then set up the sorting, accumulating, or printing mechanisms in accordance with the analysis.

Improvements over this technique were made by Maul and are described in his U. S. Patent No. 2,000,403. Maul eliminated the need for perforations on the record sheet by using an optical analyzer. With this system the optical analyzer was made to observe printed characters wherein the characters were differentiated from each other by varying their relative sizes. Thus, with each character covering a different percentage of a standard field, an analyzing beam was directed with uniform intensity at all portions of the field. The quantity of light reflected toward a photocell unit thus varied according to portion of the field area covered by the character. In this system only one photocell is required for each analyzing mechanism.

In another technique described by Maul, four imaginary index points were arranged in the field of each character. Then each character, when printed, would cover one or more of these index points depending on the contour of the character, thus providing a different code for each character tabulated. Photocells were arranged so that each received reflected light from one of the index point positions of the character field. All of these systems, while quite satisfactory, require relatively elaborate and expensive equipment for accurately placing the characters or code on the paper in the proper position as very little tolerance is allowed.

Another type of analyzing or reading system has been provided which is not limited to numerals in fixed areas. This arrangement is described in Patent No. 1,815,986, wherein a Telegraph Reading Machine is disclosed. In this system a typewritten message may be placed in an analyzing device, wherein each letter of the message is passed through a scanning area to be scanned by a typical perforated disc television type scanner. The characteristics of the area scanned vary the scanning output signal which controls the operation of code selector elements to send out a code representation of a scanned character area.

While these optical systems of reading typewritten characters from sheets of paper have been a great improvement over the punched index perforations, they also have several limitations. One of these is that a large scanning head is required, whether the head itself is to be moved over the copy, or the head held stationary and the copy moved. Another is that optical scanning equipment is quite costly. Finally, there is the consideration of signal-to-noise ratio. With the optical method, even assuming the use of an electric typewriter with firm pressure, the ratio of the reflectivity (for reflected light) or opacity (for straight-through transmission) of the inked spots, as compared to the uninked portions of the paper, is low, with a resulting relatively poor signal-to-noise ratio. This objection is particularly emphasized when considering the scansion of a small area such as a dot or a comma. To obtain a favorable signal-to-noise ratio in this case, the scanning beam would have to be no larger than the dimensions of a dot. This, in turn, would require very accurate vertical alignment as the scanning mechanism moves horizontally along a typewritten line.

Consequently, an object of this invention provides a system whereby printed information may be accurately scanned and read.

Another object of this invention is to provide a relatively inexpensive method and apparatus for automatically reading information printed in accordance with the invention.

A purpose of this invention is to provide a system for packing printed information in code on tape for storage, thereby reducing the amount of storage space required.

A further object of this invention is to provide apparatus for reducing the background noise produced in scanning printed information, thereby allowing the reading of characters which are smaller and which have less printing contrast.

Another object of this invention is to provide a system which allows the use of compact equipment.

A further object of this invention is to provide a system requiring less accurate alignment of the scanned characters.

These and further objects of the present invention are achieved by providing a method and apparatus for magnetizing code positions in typewritten characters so that the print may then be read directly by a magnetic pickup head. Specifically, the typeface of each individual type is provided with preselected magnetized spots, these spots being arranged to have an individual code configuration for each character. The typewriter is provided with an inked ribbon having powdered magnetic material mixed with the ink. Thus when pressed against the paper by a type character both the magnetic material and ink are deposited on the paper, and because of the magnetized spots on the type face, corresponding magnetized spots result in the characters on the paper copy. The paper copy may then be read visually and scanned by a magnetic pickup head from which coded pulses are obtained that are representative of the characters scanned. These pulses may be used to operate automatic typesetters, a telegraph, or other similar automatic equipment. In the magnetic method, the areas scanned by an individual pickup head could be considerably larger than an elemental area, such as a dot, since all that is required is the presence or absence of some magnetic material somewhere within the areas scanned. This allows more accurate scanning, because of the reduced background noise. Blank portions of the paper can cause no trouble because they are completely non-magnetic. Further, magnetic scanning heads are very small and compact and can be economically produced.

Further objects of this invention, as well as a better understanding thereof, will become apparent from the following description considered in conjunction with the accompanying drawings in which.

Figures 1, 2, 3, 4:
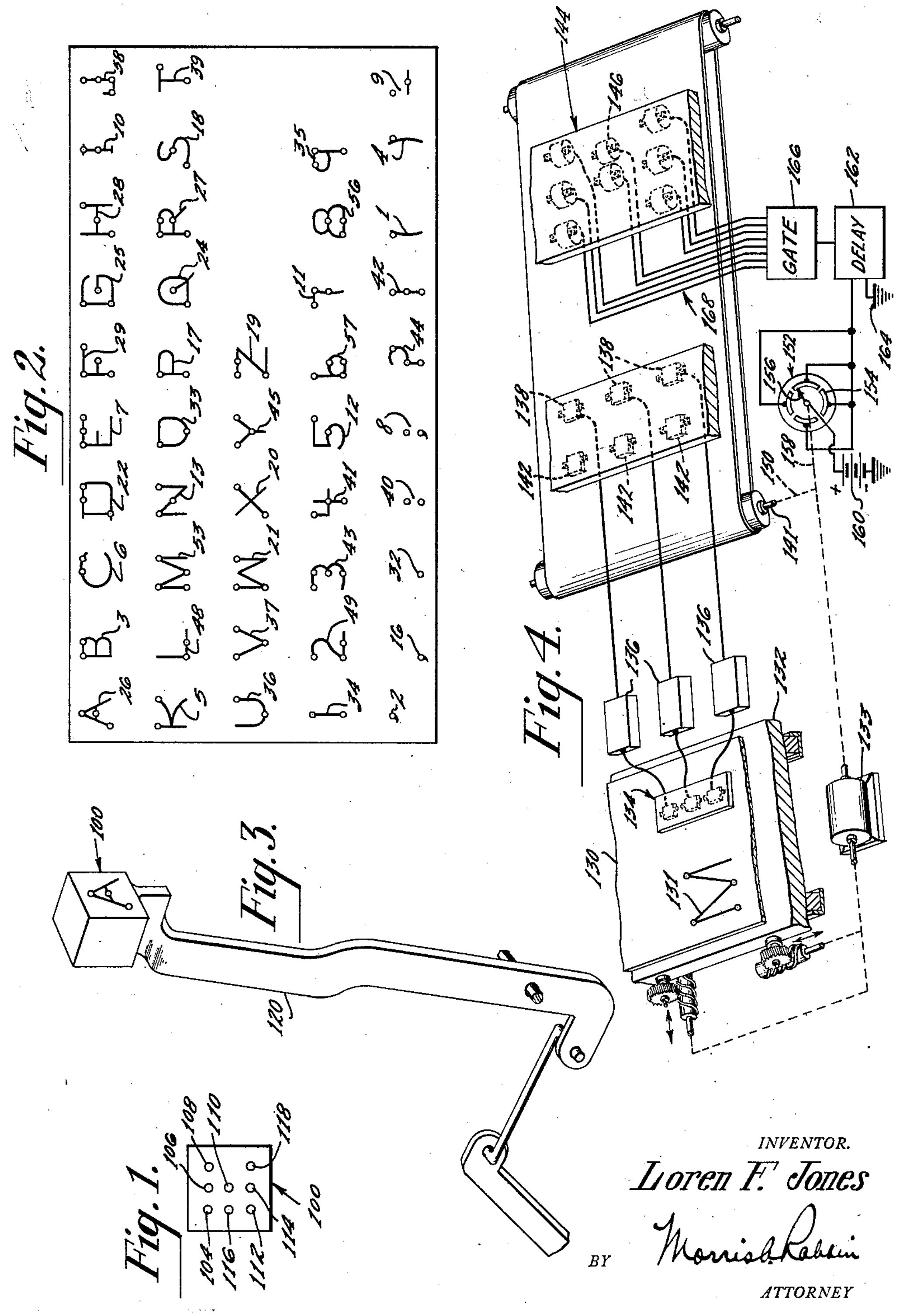
Fig. 1 illustrates an enlarged view of the typeface of a typewriter key diagrammatically showing a typical index point arrangement for the code used.
Fig. 2 illustrates a possible coding for the characters.
Fig. 3 illustrates an enlarged view of a typewriter key modified in accordance with the invention to include a typical index point arrangement that may be used to encode the individual characters; and, Fig. 4 indicates one form of a reading circuit which may be utilized.

The invention is most easily explained in its preferred embodiment which uses a typewriter somewhat similar to present types. The invention, however, may be used in any mechanical printer which utilizes characters, ink, and causes the characters to be imprinted on paper or other suitable material. The ribbon and type of the typewriter contemplated in this invention are essentially the only parts that differ from those employed in a standard typewriter. Thus, in the preferred embodiment the type characters used are composed of any suitable non-magnetic material and have miniature permanent magnet inserts embedded at selected points in the type face to provide magnetic sole pieces. The type characters may be formed in the usual manner used in their manufacture, then drilled, and the inserts placed in the drilled positions. These magnetic inserts may be made of any material having a high magnetic susceptibility such as a composition of aluminum, nickel, and cobalt, which is well known on the market as "Alnico." The arrangement and positions of these magnets or magnetic pole pieces are determined by the code representation used to indicate the various characters.

If the characters of the alphabet, the numerals and the punctuation marks are to be accommodated, there will be necessitated a total of about 45 characters. Here, any suitable code digit representation may be used. One representation that is applicable makes use of binary principles and requires 6 digits. Although these 6 digits could be arranged vertically for each letter, it may be preferable to use the arrangement shown in Fig. 1. This requires only three vertical levels, which allows greater ease of operation since the index points are farther apart and, therefore, do not require vretical precision of alignment in the scanning process.

Referring to Fig. 1 there is shown a rectangule 100 which represents the typeface of a typewriter key. The characters to be printed, while normally appearing on the type-face 100 in a raised position, are not shown in Fig. 1 for better clarity of illustration. The type face 100 contains the six-digit representation of the letters of the alphabet in the form of six magnets, 104, 106, 108, 110, 112, and 114, each of which when in position has a value assigned to it in the binary system. Thus the six binary index points or digits occupy the upper three, the center, and the lower left and lower center positions of the type face 100 which represents the maximum area covered by a single character. For the various values, the upper left digit 104 represents the binary one, the upper center digit 106 represents the binary two, the upper right digit 108 represents the binary four, the center digit 110 represents the binary eight, the lower left digit 112 represents the binary sixteen, and the lower center digit 114 represents the binary thirty-two, as is shown in Fig. 1.

In addition to these number values for the letters of the alphabet, the center left position 116 could be used to indicate capitals, and the lower right position 118 for "line return." This arrangement requires only three vertical locations, with resulting greater ease of maintenance of vertical alignment, as the printed copy is scanned horizontally.

In Fig. 2, there is represented a suggested binary coding for each character, thus illustrating how the typefaces, described in Fig. 1, will appear for each character. Using the arrangement shown in Fig. 1, the numbers above each character in Fig. 2 are the binary sum numbers represented by the magnetic spot positions in the binary digit code for each character. Each type face will have only as many magnetic inserts as are required to represent the particular character of the type face. Thus, in the Fig. 3 letter "A," shown in its normal position on the typeface 100 of a typical typewriter key 120, has magnetic spots placed in the upper center, the center, and the lower left positions which have binary values of two, eight, and sixteen, respectively. This causes the total binary value to be twenty-six which is indicated above the letter. The binary value for the remaining letters and symbols is calculated in this same manner. It should be noted that most of the characters need not be appreciably distorted from their normal shape in order to have magnetic spot positions fall on the character outline. The magnetic spot positions should fall on the character outline, rather than off it, to allow better visual readability of the printed copy, although this arrangement is not absolutely necessary.

An inked ribbon similar to that of standard typewriter ribbons is used with this invention. The ribbon is preferably of non-magnetic material. Powdered magnetic material similar to that used in making magnetic tape or magnetic sound track on film is mixed with the ink on the ribbon. This composite material may be of any type as long as it will imprint on the paper and is capable of having portions of the material magnetized.

In operation, when a typewriter is used and a type member strikes the paper through the ribbon, the usual printed character appears on the paper for visual reading. At the same time that the type comes in contact with the ribbon, the magnetized spots on the type face magnetize corresponding points in the powdered material on the ribbon. This powdered material, containing the magnetized spots, is simultaneously transferred to the paper along with the ink, leaving the paper copy with a visual representation and a magnetic identification for each character.

Characters thus produced may be used for reproducing copies, sending them over telegraph facilities, operating type-setting machines, with business machines or other functions. In general this paper copy, which may be the one originally typed, may be used to operate any equipment wherein automatic reading of the original typewritten material is desirable or important. This obviously eliminates the manual transfer to the input device of a machine when needed.

In Fig. 4, an arrangement for scanning the paper copy and recording the pulse code output on magnetic tape is shown as illustrative of output apparatus that can be used with this invention. A portion of a paper copy 130 containing the printed and magnetic representation of a character "M" 131 is shown mounted on a scanning platform 132. The scanning platform, driven by a scanning platform drive 133, moves the paper vertically and horizontally under three magnetic scanning heads 134. The character 131 is shown greatly enlarged to illustrate more clearly the magnetic spots as described above. The magnetic scanning heads 134 are mounted by an apparatus (not shown) above the paper copy 130. The vertical and horizontal movement of the scanning platform causes each line of typewritten characters to be scanned by the scanning heads typically from left to right so as to scan the entire paper copy 130. These scanning heads may be of the type described by Booth in "Electronic Engineering," July 1949, on page 234. The scanning heads, described by Booth, are small and compact, and are particularly applicable to scaning small areas of printed material. However, any other type of magnetic recording pickup which is suitable can be used. It is to be understood that, if desired, the paper may be held stationary and the heads moved over it.

The outputs of the scanning heads 134 are fed individually to amplifiers 136 wherein they are amplified. The amplifier outputs are applied to three recording heads 138 mounted adjacent a continuous magnetic tape 140. The tape is driven by a tape drive 141. The amplifier outputs are on the magnetic tape. An erasing means 142, which may be magnetic pickup heads, permanent magnets, or other magnetic erasing means, is positioned just ahead of the recording heads 138 on the tape so as to eliminate any previously recorded signals. Additional pickup heads 144, which may be of the same type as the scanning heads 134, are positioned to the right of the recording heads 138 along the tape. These heads are arranged to be in the reverse to the configuration of the code index positions shown in Fig. 1.

A mechanical coupling 150 is connected between the scanning platform drive 133 and the magnetic tape drive 141, thereby holding the scanning speed and the tape speed in a preselected speed ratio. A commutator 152 having a plurality of switch elements 154 and a rotor 156 is provided. The rotor is adapted to be driven by a mechanical coupling 158 connected between the rotor 156 and the scanning platform drive 133.

The rotor is electrically connected to the positive terminal of a battery 160 and each switch element of the commutator to a delay circuit 162. A ground connection 164 on the delay circuit completes a circuit from the positive side of the battery to the negative side of the battery which is also grounded. Since all the typewritten characters are equally spaced, synchronizing pulses corresponding to each typewriter character position are generated as the scansion takes place by selecting the proper number of switch elements for the rotor speed.

The delay circuit is connected to a gate circuit 166 which, in turn, is connected to each of the pickup heads 144 by individual leads 168. The delay is for a sufficient time to allow each individual scanned character from the paper copy to be recorded on the tape and reach a position directly under the pickup heads. At this instant the pickup heads are energized to receive the identifying code for the particular letter and transmit it to utilization apparatus. The utilization apparatus may be of the type described in U. S. Patent 2,000,403 to Maul, or any other type which operates responsive to signals representing coded characters. For example, the apparatus shown in Fig. 7 of Maul can be adapted to operate an automatic tabulating machine from the character code of this invention.

While a particular output apparatus has been described. it is understood that any suitable apparatus capable of scanning, subsequent pulse identification, and utilization of the encoded characters may be used with this invention.

If storage of the information is desired, the magnetic tape 140 is run at relatively low speed, as the scansion takes place, to pack the information. Packing the information in this manner merely places the code spots closer together, thereby requiring much less storage space. In the event this alternative is used, the magnetic tape 140 is fed to a takeup reel (not shown) for storage instead of being a continuous strip as used for the immediate read output apparatus described above. Also a fourth recording head (not shown) is positioned at either side of, or in between, the recording heads 138 to record the synchronized keying impulses for the reading process to enable the tape to be properly read at a later time.

If, in some cases, it is desirable to know in advance whether or not the letter is to be capitalized, the "capital" pickup head 146 may be placed in advance of its normal position so as to give advance indication of capitalization as is shown in Fig. 3. The "line" pickup head, when used, will indicate that the end of a typewritten line has been reached on the original copy. This enables any reproducing equipment to act accordingly.

It is a well known fact that magnetic pickup apparatus does not require a large magnetic area to obtain an effective signal. A relatively small magnetic area within the scanned area of each scanning head is sufficient to give the necessary code signal required for detection. Consequently, less accurate vertical alignment of the characters and scanning apparatus, as well as less printing contrast for the printed characters is tolerable. The sole requirement is that the magnetic areas be within detecting distance of the pickup heads which, as previously pointed out, can be made relatively small.

It is contemplated that the inked ribbon used with the mechanical printer or typewriter will be cheaply constructed and used only once, since after use it contains magnetized areas. However, by simple "erasing" techniques it would be possible to use the ribbon any number of times until the magnetizable material is depleted.

It is further understood that the use of this invention is not limited to printing on paper as any non-magnetic material capable of receiving print may be used. Nor is the invention limited to non-magnetic material, since some magnetic materials capable of receiving an ink character may be used. However, in this latter case there will be a loss in the signal-to-noise ratio.

While the invention has been described with particular reference to a typewriter, it will be clear that the techniques involved are not limited thereto. Thus, by using a magnetizable ink and code magnetized type, the same results may be obtained with standard printing apparatus.

As a further modification of my invention, it is possible to use the principles involved for secrecy purposes. Thus, an innocuous message may be typed by a standard typewriter and the secret message typed by a typewriter constructed in accordance with the invention but using a ribbon which leaves only the magnetized material on the paper. By suitable selection of paper and magnetizable material, the deposit of the magnetized material may be made practically invisible.

Another embodiment of the invention, particularly applicable to secrecy systems, requires a paper which embodies magnetizable material therein. The operation in such a case is the same as described above except that there is no need for a specially prepared ribbon, and a secret message may be typed without a ribbon.

From the above explanation and description, it becomes apparent that an inexpensive method and apparatus have been provided for automatically and accurately reading printed information. This method also permits the use of compact space-saving apparatus and has a minimum of background noise, thereby allowing smaller characters and characters having less printing contrast to be read. Further, less accurate vertical alignment of the characters is required.

What is claimed is:

1. An apparatus for encoding a message comprising movable type having magnetic spots arranged in a code configuration thereon, an inked ribbon arranged in the path of movement of said type, the ink in said inked ribbon having magnetizable material incorporated therein, and means for feeding a sheet of material through said apparatus in position to receive the impression of said type through said ribbon, whereby the characters impressed on said sheet will appear in sequence on said sheet and each of said characters will have magnetized spots corresponding to said code configuration.

2. Apparatus of the type described in claim 1 wherein said magnetizable material in the ink in said inked ribbon is powdered magnetic material and wherein said type is of non-magnetic material, and said magnetic spots are portions of magnetic material imbedded in said non-magnetic type material.

3. Apparatus of the class described comprising movable type made of a non-magnetic material having permanent magnets placed therein and arranged in individual configurations for each of said type, an inked ribbon arranged in the path of movement of said type, the ink in said inked ribbon having magnetizable material incorporated therein, and means for feeding a sheet of non-magnetic material through said apparatus in position to receive the impression of said type through said ribbon, whereby the normal characters of said type will be imprinted on said sheet and each of said impressed characters will have magnetized spots corresponding to the arrangement of said magnets.

4. Apparatus for writing a reproducible message comprising movable type made of non-magnetic material having magnetic areas established therein, said areas being arranged in individual code configurations for each type, an inked ribbon arranged in the path of movement of said type, the ink in said ribbon including a powdered magnetic material, and means for feeding a sheet of non-magnetic material through said apparatus in position to receive the impression of said type through said ribbon, whereby the normal characters on said type will be imprinted on said sheet and each of said printed characters will have magnetized areas corresponding to said code configurations.

5. Apparatus of the type described in claim 4 wherein said magnetic areas in said type lie on the outline of the character the particular type represents.

6. In a typewriter the combination therewith of an inked ribbon, the ink in said ribbon including powdered magnetic material, and type made of non-magnetic material, said type having permanent magnets placed therein.

7. In a typewriter the combination of an inked ribbon, the ink in said ribbon including magnetic material, and type, said type having preselected magnetized areas.

8. In apparatus for printing on sheet material, the combination of an inked ribbon having magnetic material thereon, type operable to impress printed characters on said sheet material through said ribbon, said type being made of non-magnetic material and having magnetic portions mounted therein in a preselected code configuration.

References Cited in the file of this patent

UNITED STATES PATENTS

| | | |
|---|---|---|
| 1,021,953 | Steele | Apr. 2, 1912 |
| 1,555,281 | Engl et al. | Sept. 29, 1925 |
| 1,615,566 | Brewer | Jan. 25, 1927 |
| 1,764,120 | Robbins | June 17, 1930 |
| 1,815,010 | Pollock et al. | July 14, 1931 |
| 1,831,359 | Lasker | Nov. 10, 1931 |
| 1,925,235 | Dixon | Sept. 5, 1933 |
| 2,127,812 | Gabrielson | Aug. 23, 1938 |
| 2,229,091 | Kline | Jan. 21, 1941 |
| 2,261,542 | Dickinson et al. | Nov. 4, 1941 |
| 2,294,679 | Maul | Sept. 1, 1942 |
| 2,337,553 | Hofgaard | Dec. 28, 1943 |
| 2,359,617 | Bryce | Oct. 3, 1944 |
| 2,508,953 | Knutsen | May 23, 1950 |
| 2,511,121 | Murphy | June 13, 1950 |
| 2,559,505 | Hillier | July 3, 1951 |
| 2,561,476 | Lang | July 24, 1951 |
| 2,584,318 | Allyn | Feb. 5, 1952 |
| 2,744,031 | Mumma | May 1, 1956 |

FOREIGN PATENTS

| | | |
|---|---|---|
| 651,645 | Great Britain | Apr. 4, 1951 |